(12) United States Patent
Hirota et al.

(10) Patent No.: US 11,731,506 B2
(45) Date of Patent: Aug. 22, 2023

(54) DRIVING SYSTEM OF ELECTRIC VEHICLE (71) Applicant: GKN Automotive Limited, Birmingham (GB)

(72) Inventors: Isao Hirota, Tochigi (JP); Kazutaka Kawata, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 16 days.

(21) Appl. No.: 17/381,233

(22) Filed: Jul. 21, 2021

(65) Prior Publication Data
US 2022/0105801 A1 Apr. 7, 2022

(30) Foreign Application Priority Data

Oct. 2, 2020 (JP) .................. 2020-167483

(51) Int. Cl.
  *F16D 28/00* (2006.01)
  *B60K 23/02* (2006.01)
  *B60K 7/00* (2006.01)
(52) U.S. Cl.
  CPC ............ *B60K 23/02* (2013.01); *B60K 7/0007* (2013.01); *F16D 28/00* (2013.01); *B60K 2007/0061* (2013.01)
(58) Field of Classification Search
  CPC .......... B60K 23/02; B60K 7/0007; B60K 2007/0061; B60K 23/04; B60K 2001/001; B60K 2023/046; B60K 1/00; B60K 17/165; B60Y 2200/23; B60Y 2400/404; B60Y 2400/405; F16D 28/00; F16D 2065/386
  See application file for complete search history.

(56) References Cited

U.S. PATENT DOCUMENTS

| 5,053,297 | A | 10/1991 | Yamahira et al. |
| 5,098,360 | A | 3/1992 | Hirota |
| 5,125,876 | A | 6/1992 | Hirota |
| 10,173,516 | B2 * | 1/2019 | Tseng ............... B60K 6/365 |

(Continued)

FOREIGN PATENT DOCUMENTS

| CN | 105090397 A | 11/2015 |
| CN | 110520652 A | 11/2019 |

(Continued)

*Primary Examiner* — Jacob S. Scott
*Assistant Examiner* — Farhana Pervin
(74) *Attorney, Agent, or Firm* — Bejin Bieneman PLC (57) ABSTRACT

A driving system includes an electric motor, a transmission apparatus, a differential apparatus and a brake. The differential apparatus includes an input portion coupled to an output portion of the transmission apparatus, a pair of output portions, and a differential device that allows differential rotation of the pair of output portions. A brake is provided in a drive path from an output portion of the electric motor to the input portion of the differential apparatus. The differential apparatus includes a clutch member movable between a first position in which a differential rotation of the differential device is allowed and a second position in which the differential rotation of the differential device is stopped, a clutch actuator that moves the clutch member to the first position, and a holding portion that holds the clutch member to the second position when the clutch actuator is in a non-operating state.

14 Claims, 3 Drawing Sheets

(56) References Cited

U.S. PATENT DOCUMENTS

| | | | | |
|---|---|---|---|---|
| 11,098,793 | B1* | 8/2021 | Knapke | B60K 17/356 |
| 2005/0037890 | A1* | 2/2005 | Weber | F16H 59/10 |
| | | | | 477/96 |
| 2006/0052207 | A1 | 3/2006 | Teraoka | |
| 2011/0155486 | A1 | 6/2011 | Iwaki et al. | |
| 2015/0224867 | A1* | 8/2015 | Nett | B60K 6/48 |
| | | | | 180/65.21 |
| 2015/0354682 | A1 | 12/2015 | Yamamoto et al. | |
| 2016/0101691 | A1* | 4/2016 | Valente | F16D 11/14 |
| | | | | 475/150 |
| 2016/0339888 | A1* | 11/2016 | Yokoyama | F16D 65/18 |
| 2017/0253242 | A1* | 9/2017 | Fukada | B60W 30/182 |
| 2018/0306297 | A1 | 10/2018 | Komatsu | |
| 2020/0124168 | A1* | 4/2020 | Ohlig | F16H 63/3466 |
| 2021/0053435 | A1* | 2/2021 | Ito | B60W 30/18127 |
| 2021/0347257 | A1* | 11/2021 | Zalewski | B60K 17/356 |

FOREIGN PATENT DOCUMENTS

| | | |
|---|---|---|
| JP | H03-129150 A | 6/1991 |
| JP | 2001-041312 A | 2/2001 |
| JP | 2010-148579 A | 7/2010 |

\* cited by examiner

DRIVING SYSTEM OF ELECTRIC VEHICLE

This application is based on, and under 35 USC 119 claims priority from, Japanese Patent Application No. 2020-167483 filed on Oct. 2, 2020, the contents of which are incorporated herein by reference in their entirety.

TECHNICAL FIELD

The present disclosure relates to a driving system of an electric vehicle.

BACKGROUND

JP-A-2010-148579 discloses a driving system of an electric vehicle that includes: an electric motor serving as a driving source; a transmission apparatus that outputs a driving force of the electric motor at a predetermined speed ratio; and left and right axles that are drivingly connected to the transmission apparatus and are formed in a single shaft. The driving force of the electric motor is transmitted from the axles to left and right wheels respectively. The electric vehicle may be used as a golf cart.

In an electric vehicle such as a golf cart, it is necessary to maintain a stationary state at the time of parking. In this electric vehicle, when a controller confirms that an accelerator pedal is not depressed and a vehicle speed detected by a vehicle speed sensor is zero, an electric current flowing to an electromagnetic clutch brake is cut off and the electromagnetic clutch brake is closed, whereby the stationary state of the vehicle is maintained.

In the electric vehicle, the driving force transmitted from the transmission apparatus is uniformly transmitted to the left and right wheels by the axles formed in a single shaft. Therefore, at the time of turning of the vehicle, the axle formed in the single shaft cannot absorb a turning locus difference between the left and right wheels, and the wheels slip with respect to a road surface, thereby causing wear of the wheels and damage to the road surface. In particular, when the electric vehicle is used as the golf cart, a surface of a lawn may be shaved due to the driving force of the wheels.

Therefore, in such an electric vehicle, it is possible to provide a differential apparatus between the transmission apparatus and the left and right wheels to prevent such wear of the wheels and damage to the road surface.

However, it has been found that, when the differential apparatus is provided, the stationary state of the vehicle cannot be maintained only by operating the electromagnetic clutch brake in a structure in which the stationary state of the vehicle is maintained by the electromagnetic clutch brake.

The reason for this is that, for example, when the stationary state of the vehicle is maintained in a state where the vehicle is stopped on an inclined surface, by providing the differential apparatus, the mounted differential apparatus absorbs a rotation difference between the left and right wheels due to an imbalance in a contact state (inclination, friction resistance, gravity resistance, or the like) between each of the left and right wheels and a road surface.

In order to address this problem, it is possible to stop the left and right wheels by operating a drum brake as disclosed in JP-A-2010-148579. However, in this case, in addition to a first operating state corresponding to a foot brake serving as an original function, a second operating state corresponding to the stationary state of the vehicle, which is functionally different from the first operating state, must be added to the drum brake. For this reason, a driving system of an electric vehicle becomes complicated and increases in size.

SUMMARY

A driving system of an electric vehicle includes an electric motor that serves as a driving source, a transmission apparatus coupled to a rotation output portion of the electric motor, a differential apparatus, and a brake. The differential apparatus includes a rotation input portion coupled to a rotation output portion of the transmission apparatus, a pair of rotation output portions connected to left and right wheels, and a differential device that is capable of allowing differential rotation of the pair of rotation output portions. The brake is provided in a drive path from the rotation output portion of the electric motor to the rotation input portion of the differential apparatus. The brake is capable of stopping rotation of a rotating body on the drive path with respect to a stationary member. The differential apparatus further includes a clutch member, a clutch actuator, and a holding portion. The clutch member is movable between a first position in which a differential rotation of the differential device is allowed and a second position in which the differential rotation of the differential device is stopped. The clutch actuator moves the clutch member to the first position. The holding portion is capable of holding the clutch member to the second position when the clutch actuator is in a non-operating state.

DESCRIPTION

A driving system 1 of an electric vehicle includes an electric motor 3, a transmission apparatus 7, and a differential apparatus 19. The electric motor 3 serves as a driving source. The transmission apparatus 7 includes a rotation input portion 6, which is drivingly coupled to a rotation output portion 5 of the electric motor 3, and a rotation output portion 9. The differential apparatus 19 includes a rotation input portion 11 that is drivingly coupled to the rotation output portion 9 of the transmission apparatus 7, a pair of rotation output portions 15 for left and right wheels 13, and a differential device 17 that is capable of allowing differential rotation of the pair of rotation output portions 15.

In a drive path from the rotation output portion 5 of the electric motor 3 to the rotation input portion 11 of the differential apparatus 19, a brake 23 capable of stopping rotation of a rotating body on the drive path with respect to a stationary member 21 is provided.

The differential apparatus 19 includes a clutch member 25 that is operable to be moved to a first position where it is possible to allow differential rotation of the differential device 17, and a second position where it is possible to stop the differential rotation of the differential device 17, a clutch actuator 27 that is operated to move the clutch member 25 to the first position, and a holding portion 29 that is capable of holding the clutch member 25 to the second position when the clutch actuator 27 is in a non-operating state.

The holding portion 29 is a biasing member capable of biasing the clutch member 25 and holding the clutch member 25 to the second position.

According to an example, the clutch actuator 27 includes an electric operation portion 31 that is annularly and coaxially disposed on an outer peripheral side of the rotation output portion 15 and that is capable of being operated to move the clutch member 25 to the first position by using an electric operation force generated by energization. The biasing member is a spring that is capable of mechanically moving the clutch member 25 to the second position when energization to the electric operation portion 31 is stopped.

The brake 23 includes a brake actuator 33 that releases the brake 23 from the stationary member 21 by using an electric operation force generated by energization, and a biasing member 35 that mechanically couples the brake 23 to the stationary member 21 when energization to the brake actuator 33 is stopped.

The clutch actuator 27 or the brake actuator 33 is activated and energized when an ignition switch 37 for performing selection of vehicle start is ON, and is activated and de-energized when the ignition switch 37 is OFF.

A selection unit 39 is provided that is capable of stopping the energization to the clutch actuator 27 when the clutch actuator 27 is energized in a state where the ignition switch 37 is ON.

The ignition switch 37 being ON or OFF is determined based on an operation of any one of a rotation key, a push button, a depression-type pedal, a touch panel, and a lever for rotation or reciprocating operation.

The energization to the brake actuator 33 is stopped in conjunction with OFF of the ignition switch 37 at a timing earlier than a timing at which energization to the clutch actuator 27 is stopped.

The energization to the clutch actuator 27 is stopped in conjunction with OFF of the ignition switch 37 at a timing earlier than a timing at which energization to the brake actuator 33 is stopped.

The energization to the clutch actuator 27 and the brake actuator 33 is immediately stopped in conjunction with OFF of the ignition switch 37.

The brake 23 is coaxially disposed on an outer peripheral side of a motor shaft serving as the rotation output portion 5 of the electric motor 3.

An example of a power system in the driving system 1 of the electric vehicle will be described with reference to FIG. 1.

Figure 1:
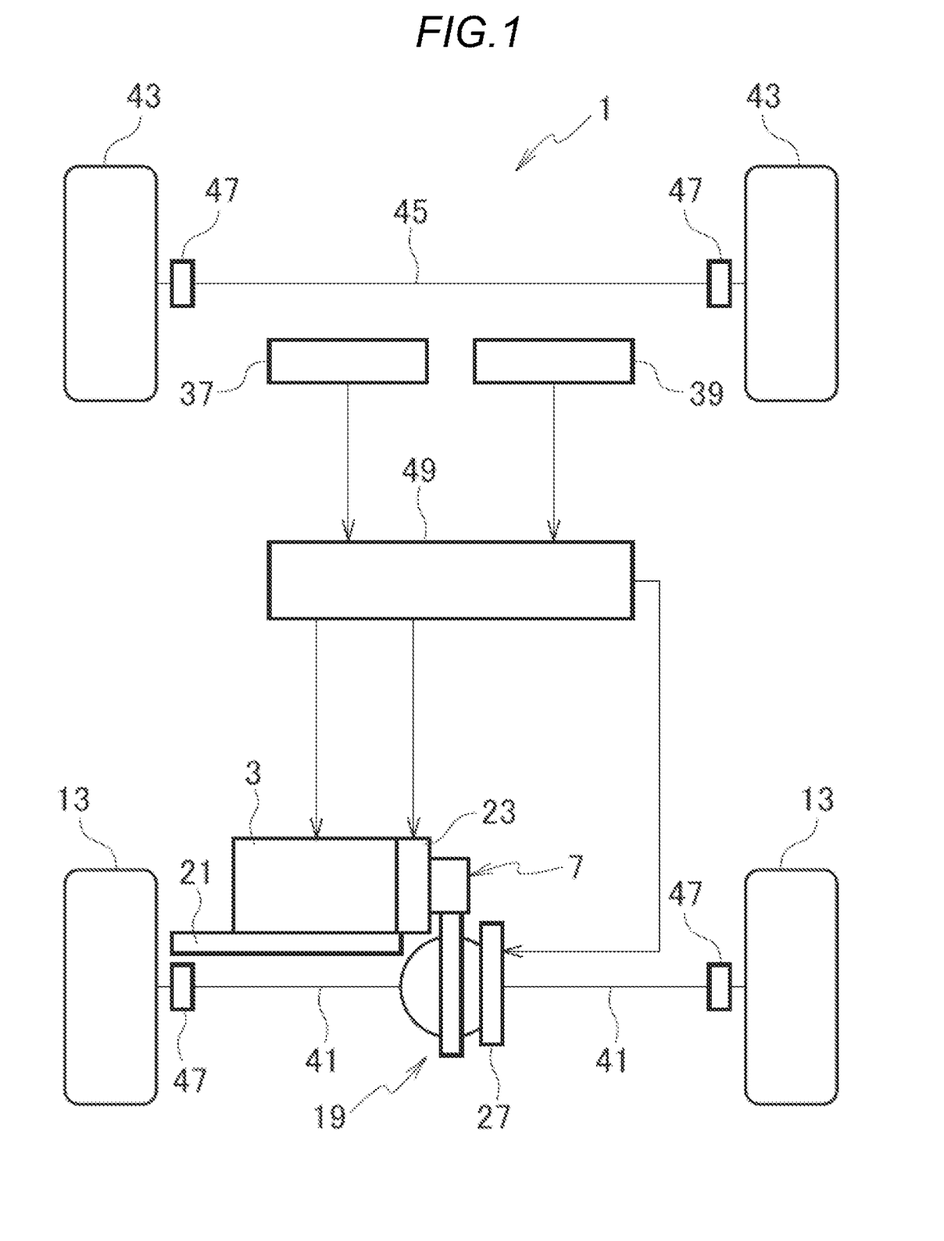
FIG. 1 is a schematic diagram of a driving system of an electric vehicle.

As illustrated in FIG. 1, a power system in the driving system 1 of an electric vehicle includes the electric motor 3 serving as a driving source, the transmission apparatus 7, the differential apparatus 19 that allows differential rotation of left and right rear wheels, rear axles 41, wheels 13 as rear wheels, and the like. Wheels 43 as front wheels are rotatably coupled to a front axle 45 formed in a single shaft, and are driven wheels driven by a driving force from a rear wheel side.

In the power system of the driving system 1 of an electric vehicle that is configured as described above, a driving force from the electric motor 3 is transmitted to the differential apparatus 19 via the transmission apparatus 7. The driving force transmitted to the differential apparatus 19 is distributed to the left and right wheels 13 via the rear axles 41 to drive the vehicle.

In the vicinity of the wheels 13, 43, drum brakes 47, which are actuated in response to an operation of a foot brake pedal (not illustrated) mounted on the vehicle, are arranged respectively, and the wheels 13, 43 are braked in response to the operation of the foot brake pedal.

Although the front wheels and rear wheels may be braked separately by the operation of the drum brakes 47 according to the operation of the foot brake pedal, the vehicle can be sufficiently decelerated based on a deceleration operation of a driver when a regenerative brake function of the electric motor 3 is used, and either the front drum brakes 47 or the rear drum brakes 47 can be omitted, or both the front drum brakes 47 and the rear drum brakes 47 can be omitted in some cases.

The driving system 1 of the electric vehicle will be described with reference to FIGS. 1 to 3.

Figure 2:
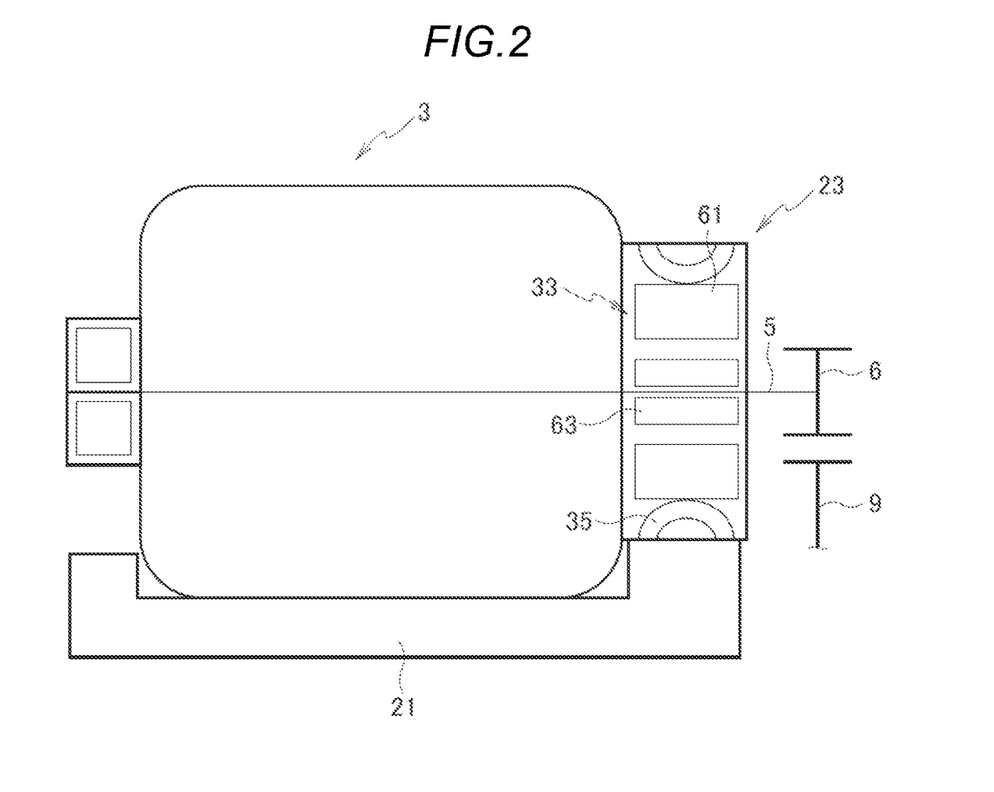
FIG. 2 is a schematic diagram of the electric motor and a brake of the driving system of the electric vehicle.
Figure 3:
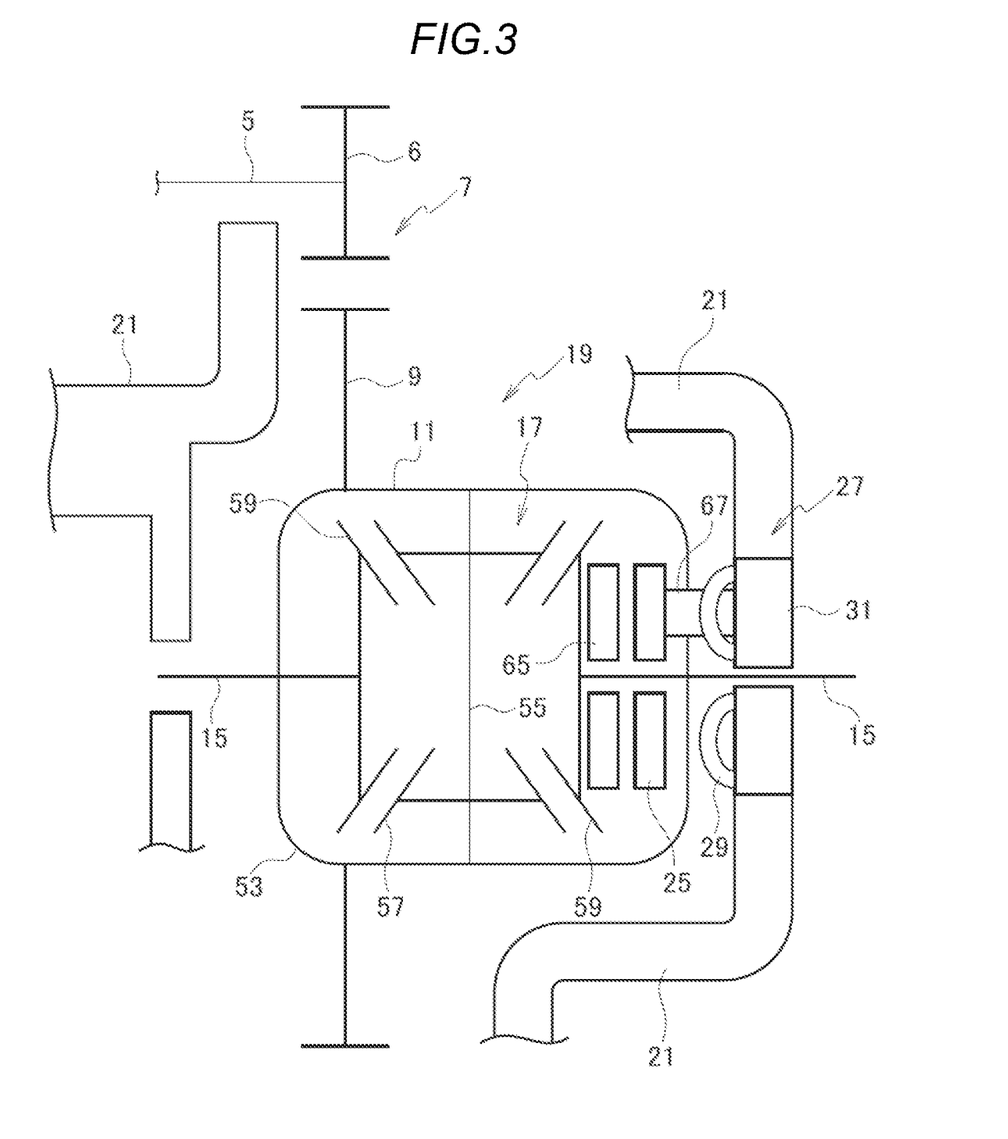
FIG. 3 is a schematic diagram of a differential apparatus of the driving system of the electric vehicle.

As illustrated in FIGS. 1 to 3, the driving system 1 of the electric vehicle includes the electric motor 3, the transmission apparatus 7, the differential apparatus 19, and a controller 49.

The electric motor 3 is supported by and fixed to, for example, the stationary member 21 such as a vehicle frame together with the transmission apparatus 7 and the differential apparatus 19. The electric motor 3 is electrically connected to a power supply (not illustrated) such as a battery mounted on the vehicle, and is driven by power supplied from the power supply.

The electric motor 3 is electrically connected to the controller 49, and the motor shaft as the rotation output portion 5 is rotationally driven under the control of the controller 49. The rotation input portion 6 of the transmission apparatus 7 is drivingly coupled to the rotation output portion 5.

The transmission apparatus 7 is appropriately selected from, for example, a reduction gear mechanism, a belt mechanism, a chain mechanism, a friction roller, or a continuously variable transmission apparatus of a belt type, a chain type, or a toroidal type. The transmission apparatus 7 is provided with the rotation input portion 6 that is drivingly coupled to the rotation output portion 5 of the electric motor 3.

Note that the reduction gear mechanism is not limited to one stage speed reduction, and a plurality of stages of gear mechanisms including a plurality of rotary electric shafts may be used, or an internal reduction gear mechanism using an internal gear may be used.

The transmission apparatus 7 shifts the driving force of the electric motor 3 so that the driving force is input from the rotation input portion 6 and output from the rotation output portion 9, and outputs the driving force from the rotation output portion 9. The rotation input portion 11 is integrally and drivingly coupled to the rotation output portion 9. The rotation input portion 11 forms a differential case 53 of the differential apparatus 19.

The differential apparatus 19 includes the differential device 17. The differential device 17 includes the differential case 53 serving as the rotation input portion 11, pinion shafts 55, differential gears 57, and a pair of output gears 59.

The differential case 53 is rotatably supported by the stationary member 21 having a carrier shape, via bearings (not illustrated) at outer peripheries on both sides in an axial direction. The differential case 53 has a case shape in which the differential gears 57 and the pair of output gears 59 are accommodated.

The pinion shafts 55, the differential gears 57, and the pair of output gears 59 are accommodated in the differential case 53, and the driving force of the electric motor 3 input to the differential case 53 via the rotation output portion 9 is transmitted therein.

The pinion shafts 55 are engaged with the differential case 53 at end portions thereof, and are rotationally driven integrally with the differential case 53. On end portion sides of the pinion shafts 55, the differential gears 57 are respectively supported.

A plurality of differential gears 57 are arranged at equal intervals in a circumferential direction of the differential case 53. The plurality of differential gears 57 are supported on the end portion side of the pinion shafts 55, and revolve by rotation of the differential case 53. The differential gears 57 are rotatably supported by the pinion shafts 55 so as to transmit the driving force to the pair of output gears 59 and to be rotationally driven when differential rotation occurs between the pair of output gears 59 meshing with each other.

The pair of output gears 59 are disposed so as to be rotatable relative to the differential case 53, and mesh with the differential gears 57. The pair of output gears 59 are provided with a pair of rotation output portions 15 that are integrally rotatable with the pair of output gears 59.

The pair of rotation output portions 15 are drivingly coupled to the rear axles 41 via a constant velocity joint (not illustrated) so as to be rotatable integrally with the rear axles 41. The pair of rotation output portions 15 output the driving force of the electric motor 3 input to the differential case 53 to the left and right wheels 13 via the rear axles 41.

By disposing such a differential apparatus 19 between the left and right wheels 13, it is possible to absorb a turning locus difference between the left and right wheels 13 (a rotation difference between the wheels 13) during turning of the vehicle.

Therefore, it is possible to prevent wear of the wheels 13 and damage to the road surface during traveling of the vehicle. In particular, when an electric vehicle is used as a golf cart, it is possible to prevent a surface of a lawn from being shaved by the driving force of the wheels 13.

In the drive path from the rotation output portion 5 of the electric motor 3 to the rotation input portion 11 of the differential apparatus 19 in the driving system 1 of the electric vehicle, a brake 23 capable of stopping the rotation of the rotating body on the drive path with respect to the stationary member 21 is provided.

According to an example, the brake 23 is disposed on the motor shaft serving as the rotation output portion 5 of the electric motor 3, and includes the brake actuator 33 and the biasing member 35.

The brake actuator 33 includes an electric operation portion (not illustrated) and the lock member 61.

The electric operation portion is formed of, for example, a small electric motor and is electrically connected to the controller 49, and energization to the electric operation portion is controlled by the controller 49. The electric operation portion is energized under the control of the controller 49 to operate the lock member 61 via an operation mechanism or the like.

The lock member 61 is disposed at the stationary member 21 to be non-rotatable but movable in a radial direction. The lock member 61 engages with a locked portion 63, which is provided so as to be rotatable integrally with the motor shaft serving as the rotation output portion 5, when being brought close to the locked portion 63, and is released from the engagement when being separated from the locked portion 63.

The lock member 61 engages with the locked portion 63 to mechanically stop rotation of the motor shaft serving as the rotation output portion 5 with respect to the stationary member 21. The lock member 61 is biased by the biasing member 35 in a direction in which the lock member 61 engages with the locked portion 63.

The biasing member 35 is formed of a spring and constantly biases the lock member 61 in the direction in which the lock member 61 engages with the locked portion 63. In a state where the energization to the electric operation portion is stopped, the biasing member 35 moves the lock member 61 in the direction in which the lock member 61 engages with the locked portion 63, causes the lock member 61 and the locked portion 63 to be engaged with each other and held, and prevents the rotation of the motor shaft serving as the rotation output portion 5.

In the brake 23, in a stopped state of the vehicle, energization to the electric operation portion of the brake actuator 33 is stopped, and the biasing member 35 causes the lock member 61 and the locked portion 63 to be engaged with each other and held.

By the engagement between the lock member 61 and the locked portion 63, the rotation output portion 5 of the electric motor 3 is coupled to the stationary member 21, and the rotation of the rotating body on the drive path from the rotation output portion 5 of the electric motor 3 to the rotation input portion 11 of the differential apparatus 19 is stopped with respect to the stationary member 21, so that the stopped state of the vehicle is maintained.

On the other hand, when the vehicle is traveling, in the brake 23, the electric operation portion of the brake actuator 33 is energized, and the lock member 61 is moved in a direction of releasing the engagement with the locked portion 63 against a biasing force of the biasing member 35, thereby releasing the engagement between the lock member 61 and the locked portion 63.

By releasing the engagement between the lock member 61 and the locked portion 63, prevention of rotation of the motor shaft serving as the rotation output portion 5 of the electric motor 3 is released, the driving force from the electric motor 3 is transmitted to the transmission apparatus 7 side, and the vehicle can travel.

According to an example, the differential apparatus 19 includes the clutch member 25, the clutch actuator 27, and the holding portion 29.

The clutch member 25 is engaged with the differential case 53 so as to be rotatable integrally with the differential case 53, and is disposed so as to be movable in an axial direction with respect to one of the output gears 59. The clutch member 25 moves in the axial direction between a first position where the clutch member 25 is disengaged by being separated from an engaged portion 65 provided so as to be rotatable integrally with one of the output gears 59 and a second position where the clutch member 25 is engaged by being brought close to the engaged portion 65.

When the clutch member 25 is disposed at the first position, the engagement between the clutch member 25 and the engaged portion 65 of the one of the output gears 59 is released, the one of the output gears 59 and the clutch member 25, that is, the one of the output gears 59 and the differential case 53 are rotatable relative to each other, and the differential rotation of the differential device 17 is allowed.

Therefore, at the first position of the clutch member 25, the differential device 17 can absorb the rotation difference between the left and right wheels 13.

On the other hand, when the clutch member 25 is disposed at the second position, the clutch member 25 is engaged with the engaged portion 65 of the one of the output gears 59, the one of the output gears 59 and the clutch member 25, that is, the one of the output gears 59 and the differential case 53 are integrally rotatable, and the differential rotation of the differential device 17 is stopped.

Therefore, at the second position of the clutch member 25, the differential rotation of the differential device 17 is stopped, that is, the differential device 17 is in a so-called locked state, and the left and right wheels 13, 13 are rotated without rotation difference.

The clutch member 25 is operated to move in the axial direction between the first position and the second position by the clutch actuator 27 and the holding portion 29.

The clutch actuator 27 is non-rotatably disposed on the stationary member 21 such as a carrier, and includes the electric operation portion 31 electrically connected to the controller 49.

The electric operation portion 31 is formed of, for example, an electromagnetic solenoid, and is energized under the control of the controller 49, whereby an operated portion 67 is moved toward the electric operation portion 31 side by a magnetic force, and the clutch member 25 is moved toward the electric operation portion 31 side, which is the first position, via the operated portion 67.

Alternatively, the electric operation portion 31 is formed of, for example, a small electric motor, and is energized under the control of the controller 49, whereby the operated portion 67 is moved toward the electric operation portion 31 via a conversion mechanism that converts the rotation of the motor shaft into an operating force in an axial direction, and the clutch member 25 is moved toward the electric operation portion 31 side, which is the first position, via the operated portion 67.

The clutch member 25 moved to the first position by the electric operation portion 31 releases the engagement with the engaged portion 65 of the one of the output gears 59 to allow the differential rotation of the differential device 17.

The holding portion 29 is disposed between the electric operation portion 31 and the operated portion 67, and serves as a biasing member that constantly biases the clutch member 25 toward a side of the one of the output gears 59, which is the second position, via the operated portion 67.

The biasing member is formed of, for example, a spring that directly presses the clutch member 25 toward the second position side (a side of the one of the output gears 59) in the axial direction, a torsion coil spring that converts a pressing force toward the second position side in the axial direction while causing the pressing force to function in a rotational direction, or a spring provided with a link mechanism in which a moving operation direction and a load direction are different from each other.

In a state where the energization to the electric operation portion 31 is stopped, the holding portion 29 generates a moving force to move the clutch member 25 to the second position via the operated portion 67. The clutch member 25 moved to the second position by the moving force of the holding portion 29 engages with the engaged portion 65 of the one of the output gears 59 to stop the differential rotation of the differential device 17.

The differential apparatus 19 capable of locking the differential device 17 by the movement of the clutch member 25 is a differential apparatus having a so-called differential lock function. In particular, the differential apparatus 19 of the present embodiment has a normally closed differential lock function in which the differential device 17 is locked in a state where the electric operation portion 31 is not energized.

Therefore, as in the case where the vehicle is stopped, when the energization to the electric operation portion 31 is stopped in accordance with a state where the energization to the electric motor 3 is stopped, the clutch member 25 is moved to the second position and held by the holding portion 29, and the differential rotation of the differential device 17 is stopped.

At this time, for example, even when the vehicle is stopped on an inclined surface, the differential rotation of the differential device 17 is stopped, and the left and right wheels 13 are rotated without rotation difference. Therefore, as long as one wheel 13 is stopped with respect to the road surface, rotation of the other wheel 13 can be prevented, and the stopped state of the vehicle can be maintained.

Since the differential apparatus 19 has the differential lock function as described above, it is possible to stably maintain the stopped state of the vehicle without complicating the structure and increasing the size of the driving system.

In the driving system 1 of an electric vehicle, energization to the electric motor 3, the electric operation portion of the brake actuator 33, and the electric operation portion 31 of the clutch actuator 27 is controlled by the controller 49.

The controller 49 is electrically connected to the ignition switch 37 mounted on the vehicle, in addition to the electric motor 3, the electric operation portion of the brake actuator 33, and the electric operation portion 31 of the clutch actuator 27.

The controller 49 is capable of receiving information from various sensors disposed in the vehicle, and controlling an operation of each mechanism mounted in the vehicle based on received information.

The controller 49 controls the energization to the electric operation portion of the brake actuator 33 and the electric operation portion 31 of the clutch actuator 27 based on an ON or OFF operation of the ignition switch 37.

The ignition switch 37 is disposed on the vehicle, and is provided so as to be interlocked with any one of a rotation key, a push button, a depression-type pedal, a touch panel, and a lever for rotation or reciprocating operation that can be operated by an operator such as a driver.

ON or OFF of the ignition switch 37 is determined based on an operation of a provided mechanism. For example, in a case where the ignition switch 37 is provided for a rotation key, the ignition switch 37 is turned ON when the rotation key is turned to a side for starting the vehicle, and is turned OFF when the rotation key is turned to a side for stopping the vehicle.

When the ignition switch 37 is ON, the controller 49 energizes and activates the electric operation portion 31 of the clutch actuator 27 and the electric operation portion of the brake actuator 33.

When the electric operation portion 31 of the clutch actuator 27 is energized, the clutch member 25 is moved in a direction in which the engagement between the clutch member 25 and the engaged portion 65 of the one of the output gears 59 is released, and the engagement between the clutch member 25 and the engaged portion 65 is released.

By releasing the engagement between the clutch member 25 and the engaged portion 65, the differential rotation of the differential device 17 is allowed, and the rotation difference between the left and right wheels 13 at the time of turning of the vehicle can be absorbed.

In addition, when the electric operation portion of the brake actuator 33 is energized, the lock member 61 is moved in a direction in which the lock member 61 is disengaged with the locked portion 63 of the rotation output portion 5 of the electric motor 3, and the engagement between the lock member 61 and the locked portion 63 is released.

By releasing the engagement between the lock member 61 and the locked portion 63, the motor shaft serving as the rotation output portion 5 can be rotated, the driving force of the electric motor 3 can be transmitted to the differential apparatus 19 via the transmission apparatus 7, and the vehicle can travel by the driving force of the electric motor 3.

On the other hand, when the ignition switch 37 is OFF, the controller 49 stops the energization to the electric operating portion 31 of the clutch actuator 27 and the electric operation portion of the brake actuator 33.

When the energization to the electric operation portion 31 of the clutch actuator 27 is stopped, the holding portion 29 mechanically moves the clutch member 25 in the direction of engaging with the engaged portion 65 of the one of the output gears 59, so that the clutch member 25 and the engaged portion 65 are engaged with each other.

By the engagement between the clutch member 25 and the engaged portion 65, the differential rotation of the differential device 17 is stopped, and it is possible to prevent a rotation difference from occurring between the left and right wheels 13 when the vehicle is stopped.

In addition, when the energization to the electric operation portion of the brake actuator 33 is stopped, the biasing member 35 mechanically moves the lock member 61 in the direction of engaging with the locked portion 63 of the rotation output portion 5 of the electric motor 3 so that the lock member 61 and the locked portion 63 are engaged with each other, and the rotation output portion 5 of the electric motor 3 is coupled to the stationary member 21.

By the engagement between the lock member 61 and the locked portion 63, the rotation of the motor shaft serving as the rotation output portion 5 is prevented, and there is no occurrence that the driving force of the electric motor 3 is transmitted to the differential apparatus 19 side when the vehicle is stopped.

In this way, the controller 49 energizes the clutch actuator 27 and the brake actuator 33 in a state where the ignition switch 37 is ON, that is, the vehicle can be driven by energizing the electric motor 3.

On the other hand, the controller 49 stops the energization to the clutch actuator 27 and the brake actuator 33 in a state where the ignition switch 37 is OFF, that is, the energization to the electric motor 3 is stopped.

By controlling the energization by the controller 49 as described, a power supply can be shared by the electric motor 3, the clutch actuator 27, and the brake actuator 33, energy can be saved, and the structure can be simplified.

Here, when the ignition switch 37 is turned OFF, the timing of stopping the energization to the clutch actuator 27 and the brake actuator 33 can be appropriately selected.

For example, the timing of stopping the energization to the brake actuator 33 in conjunction with the ignition switch 37 being OFF may be set to be earlier than the timing of stopping the energization to the clutch actuator 27.

In this case, the transmission of the driving force from the electric motor 3 is cut off before the differential rotation of the differential apparatus 19 is stopped, initial motion of the vehicle during stop can be prevented, and a sense of security can be given to an occupant such a driver.

Further, the timing of stopping the energization to the clutch actuator 27 in conjunction with the ignition switch 37 being OFF may be set to be earlier than the timing of stopping the energization to the brake actuator 33.

In this case, the differential rotation of the differential apparatus 19 is stopped before the transmission of the driving force from the electric motor 3 is cut off, a vehicle posture of the vehicle during stop can be stabilized, and a sense of security can be given to an occupant such as a driver.

Further, stopping of the energization to the clutch actuator 27 and the brake actuator 33 in conjunction with the ignition switch 37 being OFF may be set to be performed simultaneously and immediately.

In this case, since stop of the differential rotation of the differential apparatus 19 and cut-off of the transmission of the driving force from the electric motor 3 are performed simultaneously and immediately when the vehicle is stopped, stop response of the vehicle can be improved. In addition, it is not necessary to make a control timing of the clutch actuator 27 and a control timing of the brake actuator 33 different from each other, and it is possible to make the control more simple.

Here, when the ignition switch 37 is ON, the electric operation portion 31 of the clutch actuator 27 is energized, and the differential rotation of the differential apparatus 19 is allowed.

Therefore, the rotation difference between the left and right wheels 13 at the time of turning of the vehicle can be absorbed. However, for example, when one wheel 13 travels on a rough road and runs idle, the differential apparatus 19 absorbs the rotation difference between the wheels 13, and the vehicle many not travel on the rough road.

Therefore, in the driving system 1 of an electric vehicle, the selection unit 39 capable of stopping the differential rotation of the differential apparatus 19 is provided in a vehicle interior that can be operated by an operator such as a driver.

The selection unit 39 is electrically connected to the controller 49. The selection unit 39 can be operated in a state where the ignition switch 37 is ON, that is, the vehicle can be driven by the electric motor 3, and the differential rotation of the differential apparatus 19 is allowed.

When the selection unit 39 is operated, the controller 49 stops the energization to the electric operation portion 31 of the clutch actuator 27. Therefore, the clutch member 25 is mechanically moved by the holding portion 29 and engaged with the engaged portion 65 of the one of the output gears 59, and the differential rotation of the differential apparatus 19 is stopped.

In a state where the differential rotation of the differential apparatus 19 is stopped, the driving force from the electric motor 3 is equally distributed to the left and right wheels 13 from the pair of output gears 59 when the vehicle is caused to travel. Therefore, even when one of the wheels 13 is idling, the driving force from the electric motor 3 is transmitted to the other wheel 13, so that the vehicle can travel.

As described, by providing the selection unit 39 capable of stopping the differential rotation of the differential apparatus 19 in a state where the vehicle can travel, it is possible to improve runnability of the vehicle with respect to a rough road.

The driving system 1 of an electric vehicle includes the rotation input portion 11 drivingly coupled to the rotation output portion 9 of the transmission apparatus 7, the pair of rotation output portions 15 for the left and right wheels 13, and the differential apparatus 19 including the differential device 17 capable of allowing the differential rotation of the pair of rotation output portions 15.

Therefore, it is possible to absorb the turning locus difference between the left and right wheels 13 at the time of turning of the vehicle, and it is possible to prevent wear of the wheels 13 and damage to the road surface.

In addition, the differential apparatus 19 is provided with the clutch member 25 that is operated to move to the first position where it is possible to allow the differential rotation of the differential device 17 and the second position where it is possible to stop the differential rotation of the differential device 17, the clutch actuator 27 that is operated to move the clutch member 25 to the first position, and the holding portion 29 that is capable of holding the clutch member 25 to the second position in a state where the clutch actuator 27 is not operated.

Therefore, when the vehicle travels, the clutch member 25 is disposed at the first position by the clutch actuator 27, so that it is possible to absorb the rotation difference between the left and right wheels 13 at the time of turning of the vehicle.

Further, when the vehicle is stopped, the clutch member 25 is disposed at the second position by the holding portion 29, so that occurrence of the differential rotation between the left and right wheels 13 can be prevented, and the stationary state of the vehicle can be maintained.

Therefore, in the driving system 1 of an electric vehicle, the rotation difference between the left and right wheels 13 can be absorbed without complicating the driving system 1, and the stationary state of the vehicle can be maintained.

The holding portion 29 is a biasing member capable of biasing the clutch member 25 and holding the clutch member 25 to the second position. Therefore, the holding portion 29 does not have a complicated structure, and a position of the clutch member 25 can be easily held. In addition, since the holding portion 29 is a biasing member, switching response is excellent.

Further, the clutch actuator 27 includes the electric operation portion 31 capable of moving the clutch member 25 to the first position by using an electric operation force generated by energization, and the biasing member is a spring capable of mechanically moving the clutch member 25 to the second position when the energization to the electric operation portion 31 is stopped.

Therefore, since the clutch member 25 is operated to move depending on presence or absence of energization to the electric operation portion 31, a shared power supply can serve as a power supply that is an operation source of the electric operation portion 31 and a power supply that is an operation source of the electric motor 3, and energy saving and simplification of the structure can be achieved.

In addition, the brake 23 includes the brake actuator 33 that releases the brake 23 from the stationary member 21 by using an electric operation force generated by energization, and the biasing member 35 that mechanically couples the brake 23 to the stationary member 21 when the energization to the brake actuator 33 is stopped.

Therefore, since the brake 23 is operated to move depending on presence or absence of energization to the brake actuator 33, a shared power supply can serve as a power supply that is an operation source of the brake actuator 33 and a power supply that is an operation source of the electric motor 3, and energy saving and simplification of the structure can be achieved.

Further, the clutch actuator 27 or the brake actuator 33 is activated and energized when the ignition switch 37 for performing selection of vehicle start is ON, and is activated and de-energized when the ignition switch 37 is OFF.

Therefore, the differential rotation of the differential apparatus 19 or the operation of the brake 23 is performed based on the ignition, that is, a start signal of the vehicle, and a driving system according to driver's intention can be configured.

In addition, the selection unit 39 is provided that is capable of stopping the energization to the clutch actuator 27 when the clutch actuator 27 is energized in a state where the ignition switch 37 is ON.

Therefore, when the vehicle travels, the differential rotation of the differential apparatus 19 can be arbitrarily stopped by an operator such as a driver operating the selection unit 39, and the runnability of the vehicle can be improved. In addition, by operating the selection unit 39 in a critical situation such as one where capacity of the power supply such as a battery is at a low level, it is possible to suppress consumption of energization energy to the clutch actuator 27.

Further, an ON or OFF state of the ignition switch 37 is determined based on an operation of any one of a rotation key, a push button, a depression-type pedal, a touch panel, and a lever for rotation or reciprocating operation.

Therefore, an ON or OFF state of the ignition switch 37 is determined according to an operation of a mechanically switched portion between traveling and stopping of the vehicle by an operator such as a driver, and a state of the ignition switch 37 is smoothly recognized by the operator, so that the vehicle can safely travel.

In addition, the energization to the brake actuator 33 is stopped in conjunction with OFF of the ignition switch 37 at a timing earlier than a timing at which the energization to the clutch actuator 27 is stopped.

Therefore, the transmission of the driving force from the electric motor 3 is cut off before the differential rotation of the differential apparatus 19 is stopped, the initial motion of the vehicle during stop can be prevented, and a sense of security can be given to an occupant such a driver.

Further, the energization to the clutch actuator 27 is stopped in conjunction with OFF of the ignition switch 37 at a timing earlier than a timing at which the energization to the brake actuator 33 is stopped.

Therefore, the differential rotation of the differential apparatus 19 is stopped before the transmission of the driving force from the electric motor 3 is cut off, the vehicle posture of the vehicle during stop can be stabilized, and a sense of security can be given to an occupant such as a driver.

The energization to the clutch actuator 27 and the brake actuator 33 is immediately stopped in conjunction with the OFF state of the ignition switch 37.

Therefore, since stop of the differential rotation of the differential apparatus 19 and cut-off of the transmission of the driving force from the electric motor 3 are performed immediately when the vehicle is stopped, the stop response of the vehicle can be improved. In addition, it is not necessary to make the control timing of the clutch actuator 27 and the control timing of the brake actuator 33 different from each other, and it is possible to simplify the control.

Further, the brake 23 is disposed on the motor shaft serving as the rotation output portion 5 of the electric motor 3. Therefore, when the vehicle is stopped, the rotation of the electric motor 3 serving as the driving source can be directly stopped by the brake 23, and the stopped state of the vehicle can be accurately obtained.

Although the holding portion is a biasing member such as a spring in the driving system of an electric vehicle according to the present embodiment, the present invention is not limited thereto. The holding portion may be an irreversible gear mechanism such as a worm and a wheel, a ratchet, or a check mechanism.

Although the electric operation portion of each of the clutch actuator and the brake actuator is an electromagnetic solenoid or a small electric motor, the present invention is not limited thereto. Any electric operation portion such as an electromagnetic valve of a hydraulic actuator may be used.

In addition, although the embodiment is described in which, on the drive path from the rotation output portion of the electric motor to the rotation input portion of the differential apparatus, one brake capable of stopping the rotation of the rotating body on the drive path with respect to the stationary member is provided, two or more brakes may be provided.

In this case, a second brake may be an emergency brake that is operated when a failure occurs in a first brake, or may be provided at the transmission apparatus side or the differential apparatus side to be used for maintenance of each part of the system.

Although an example is described in which the clutch member 25 is provided between the differential case 53 and one of the output gears 59, the present disclosure is not limited thereto. The clutch member 25 may be provided between two relatively rotatable members having a relationship of rotation input and rotation output in the differential device, and may be provided at a position where the differential rotation can be allowed and stopped.

Further, since the clutch actuator 27 itself has an operating function for the clutch member, the clutch actuator 27 can operate the clutch member to the first position where the differential rotation of the differential device is allowed, without relying on an operating function of the holding portion 29.

Since the brake actuator 33 itself has an operating function for the brake, the brake actuator 33 can operate to engage the lock member 61 with a drive rotating portion without relying on an operating function of the biasing member 35.

In either case, the locking and holding of the lock member 61 by the biasing member and the fastening and holding of the clutch member 25 by the holding portion are set so that the respective actuators 27 and 33 have a holding function in a non-operating state.

Although the brake is disposed on the motor shaft serving as the rotation output portion of the electric motor, the present disclosure is not limited thereto. The brake may be disposed at any position as long as being on the drive path between the electric motor and the differential apparatus. For example, the brake may be disposed at any rotating body on a path from the rotation input portion of the transmission apparatus to the rotation output portion thereof, or disposed between the rotation input portion of the differential apparatus and the stationary member.

REFERENCE SIGNS

1 driving system for electric vehicle
3 electric motor
5 rotation output portion
6 rotation input portion
7 transmission apparatus
9 rotation output portion
11 rotation input portion
13 wheel
15 rotation output portion
17 differential device
19 differential apparatus
21 stationary member
23 brake
25 clutch member
27 clutch actuator
29 holding portion
31 electric operation portion
33 brake actuator
35 biasing member
37 ignition switch
39 selection unit

What is claimed is:

1. A driving system of an electric vehicle, comprising:
an electric motor that serves as a driving source;
a transmission apparatus coupled to a rotation output portion of the electric motor;
a differential apparatus including a rotation input portion coupled to a rotation output portion of the transmission apparatus, a pair of rotation output portions connectable to left and right wheels, and a differential device that is capable of allowing differential rotation of the pair of rotation output portions; and
a brake that is provided in a drive path from the rotation output portion of the electric motor to the rotation input portion of the differential apparatus, and configured to be coupled with a stationary member and to stop rotation of the drive path with respect to the stationary member,
wherein the differential apparatus further includes:
a clutch member that is movable between a first position in which a differential rotation of the differential device is allowed and a second position in which the differential rotation of the differential device is stopped;
a clutch actuator that moves the clutch member to the first position; and
a holding portion that is capable of holding the clutch member to the second position when the clutch actuator is in a non-operating state;
the brake includes a brake actuator;
the clutch actuator or the brake actuator is activated and energized when a switch for performing selection of vehicle start is ON and is activated and de-energized when the switch is OFF; and
energization to the brake actuator is stopped in conjunction with OFF of the switch at a timing earlier than a timing at which energization to the clutch actuator is stopped.

2. A driving system of an electric vehicle, comprising:
an electric motor that serves as a driving source;
a transmission apparatus coupled to a rotation output portion of the electric motor;
a differential apparatus including a rotation input portion coupled to a rotation output portion of the transmission apparatus, a pair of rotation output portions connectable to left and right wheels, and a differential device that is capable of allowing differential rotation of the pair of rotation output portions; and
a brake that is provided in a drive path from the rotation output portion of the electric motor to the rotation input portion of the differential apparatus, and configured to be coupled with a stationary member and to stop rotation of the drive path with respect to the stationary member,
wherein the differential apparatus further includes:
a clutch member that is movable between a first position in which a differential rotation of the differential device is allowed and a second position in which the differential rotation of the differential device is stopped;
a clutch actuator that moves the clutch member to the first position; and a holding portion that is capable of holding the clutch member to the second position when the clutch actuator is in a non-operating state; and a stationary state of the electric vehicle is maintained when the brake is coupled with the stationary member and the clutch member is in the second position.

3. The driving system according to claim 2, wherein the holding portion includes a biasing member that biases the clutch member to hold the clutch member to the second position.

4. The driving system according to claim 3, wherein the clutch actuator includes an electric operation portion capable of moving the clutch member to the first position by using an electric operation force generated by energization, and wherein the biasing member includes a spring capable of mechanically moving the clutch member to the second position when energization to the electric operation portion is stopped.

5. The driving system according to claim 4, wherein the brake includes a brake actuator, and the clutch actuator or the brake actuator is activated and energized when a switch for performing selection of vehicle start is ON, and is activated and de-energized when the switch is OFF.

6. The driving system according to claim 5, wherein energization to the clutch actuator is stopped when the clutch actuator is energized in a state where the switch is ON.

7. The driving system according to claim 5, wherein ON or OFF of the switch is determined based on an operation of any one of a rotation key, a push button, a depression-type pedal, a touch panel, and a lever for rotation or reciprocating operation.

8. The driving system according to claim 5, wherein energization to the brake actuator is stopped in conjunction with OFF of the switch at a timing earlier than a timing at which energization to the clutch actuator is stopped.

9. The driving system according to claim 5, wherein energization to the clutch actuator is stopped in conjunction with OFF of the switch at a timing earlier than a timing at which energization to the brake actuator is stopped.

10. The driving system according to claim 5, wherein energization to the clutch actuator and the brake actuator is stopped immediately in conjunction with OFF of the switch.

11. The driving system according to claim 2, wherein the brake is disposed on a motor shaft serving as the rotation output portion of the electric motor.

12. The driving system according to claim 2, wherein the brake includes a brake actuator that releases the brake from the stationary member by using an electric operation force generated by energization, and a biasing member that mechanically couples the brake to the stationary member when energization to the brake actuator is stopped.

13. A driving system of an electric vehicle, comprising:

an electric motor that serves as a driving source;

a transmission apparatus coupled to a rotation output portion of the electric motor;

a differential apparatus including a rotation input portion coupled to a rotation output portion of the transmission apparatus, a pair of rotation output portions connectable to left and right wheels, and a differential device that is capable of allowing differential rotation of the pair of rotation output portions; and a brake that is provided in a drive path from the rotation output portion of the electric motor to the rotation input portion of the differential apparatus, and configured to be coupled with a stationary member and to stop rotation of the drive path with respect to the stationary member, wherein the differential apparatus further includes:

a clutch member that is movable between a first position in which a differential rotation of the differential device is allowed and a second position in which the differential rotation of the differential device is stopped;

a clutch actuator that moves the clutch member to the first position; and a holding portion that is capable of holding the clutch member to the second position when the clutch actuator is in a non-operating state;

the brake includes a brake actuator;

the clutch actuator or the brake actuator is activated and energized when a switch for performing selection of vehicle start is ON and is activated and de-energized when the switch is OFF; and energization to the clutch actuator is stopped in conjunction with OFF of the switch at a timing earlier than a timing at which energization to the brake actuator is stopped.

14. A driving system of an electric vehicle, comprising:

an electric motor that serves as a driving source;

a transmission apparatus coupled to a rotation output portion of the electric motor;

a differential apparatus including a rotation input portion coupled to a rotation output portion of the transmission apparatus, a pair of rotation output portions connectable to left and right wheels, and a differential device that is capable of allowing differential rotation of the pair of rotation output portions; and a brake that is provided in a drive path from the rotation output portion of the electric motor to the rotation input portion of the differential apparatus, and configured to be coupled with a stationary member and to stop rotation of the drive path with respect to the stationary member, wherein the differential apparatus further includes:

a clutch member that is movable between a first position in which a differential rotation of the differential device is allowed and a second position in which the differential rotation of the differential device is stopped;

a clutch actuator that moves the clutch member to the first position; and a holding portion that is capable of holding the clutch member to the second position when the clutch actuator is in a non-operating state;

the brake includes a brake actuator;

the clutch actuator or the brake actuator is activated and energized when a switch for performing selection of vehicle start is ON and is activated and de-energized when the switch is OFF; and energization to the clutch actuator and the brake actuator is stopped immediately in conjunction with OFF of the switch.

* * * * *